United States Patent
Burcham et al.

(10) Patent No.: US 9,319,379 B1
(45) Date of Patent: Apr. 19, 2016

(54) METHODS AND SYSTEMS OF GENERATING A UNIQUE MOBILE DEVICE IDENTIFIER

(71) Applicant: Sprint Communications Company L.P., Overland Park, KS (US)

(72) Inventors: Robert H. Burcham, Overland Park, KS (US); Geoff A. Holmes, Olathe, KS (US); Robin D. Katzer, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 350 days.

(21) Appl. No.: 13/956,367

(22) Filed: Aug. 1, 2013

(51) Int. Cl.
*H04L 29/08* (2006.01)
*H04L 29/12* (2006.01)

(52) U.S. Cl.
CPC .................................. *H04L 61/3015* (2013.01)

(58) Field of Classification Search
CPC ... H04W 76/023; H04W 76/02; H04W 88/06; H04L 29/1232; H04L 61/2092
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 | 11/2001 | Katayanagi et al. | |
| 6,332,127 B1 | 12/2001 | Bandera et al. | |
| 6,826,575 B1 | 11/2004 | Waclawski | |
| 6,834,266 B2 | 12/2004 | Kumar et al. | |
| 6,839,680 B1 | 1/2005 | Liu et al. | |

(Continued)

FOREIGN PATENT DOCUMENTS

| | | |
|---|---|---|
| WO | WO03044703 A1 | 5/2003 |
| WO | WO2015038562 A1 | 3/2015 |

OTHER PUBLICATIONS

Final Office Action dated Jun. 29, 2010, U.S. Appl. No. 11/558,021, filed Nov. 9, 2006, 28 pages.

(Continued)

*Primary Examiner* — Kim T Nguyen

(57) ABSTRACT

A method of generating a user identifier is disclosed. The method comprises identifying, by a client, that the client does not have a device identifier associated with the device, wherein the device identifier is a device system identifier unique to the device. The method also comprises requesting, by the client, the device identifier from the device in response to identifying that the client does not have the device identifier. The method further comprises receiving, by the client, the device identifier. The method also comprises masking, by the client, the device identifier with client logic. The method further comprises generating, by the client, the user identifier based on masking, wherein the user identifier is unique to the device, and wherein the user identifier is attached to one or more interactions with one or more applications used by the device.

20 Claims, 8 Drawing Sheets

(56) References Cited

U.S. PATENT DOCUMENTS

| | | | |
|---|---|---|---|
| 6,853,982 | B2 | 2/2005 | Smith et al. |
| 6,910,017 | B1 | 6/2005 | Woo et al. |
| 6,963,867 | B2 | 11/2005 | Ford et al. |
| 6,966,536 | B2 | 11/2005 | Enomoto et al. |
| 6,990,462 | B1 | 1/2006 | Wilcox et al. |
| 7,022,905 | B1 | 4/2006 | Hinman et al. |
| 7,065,532 | B2 | 6/2006 | Elder et al. |
| 7,096,194 | B2 | 8/2006 | Johnson |
| 7,127,313 | B2 | 10/2006 | Neri |
| 7,143,143 | B1 | 11/2006 | Thompson |
| 7,251,615 | B2 | 7/2007 | Woo |
| 7,284,033 | B2 | 10/2007 | Jhanji |
| 7,353,267 | B1 | 4/2008 | Cunningham et al. |
| 7,406,436 | B1 | 7/2008 | Reisman |
| 7,437,308 | B2 | 10/2008 | Kumar et al. |
| 7,481,367 | B2 | 1/2009 | Fees et al. |
| 7,647,258 | B2 | 1/2010 | William et al. |
| 7,676,394 | B2 | 3/2010 | Ramer et al. |
| 7,680,899 | B1 | 3/2010 | Barnes et al. |
| 7,788,644 | B2 | 8/2010 | Koduru et al. |
| 7,801,518 | B1 | 9/2010 | Urbanek |
| 7,840,498 | B2 | 11/2010 | Frank et al. |
| 7,958,005 | B2 | 6/2011 | Dangaltchev |
| 7,974,616 | B1 | 7/2011 | Urbanek |
| 8,214,454 | B1 | 7/2012 | Barnes et al. |
| 8,326,673 | B1 | 12/2012 | Biere et al. |
| 8,423,408 | B1 | 4/2013 | Barnes et al. |
| 8,442,858 | B1 | 5/2013 | Barnes et al. |
| 2001/0039500 | A1 | 11/2001 | Johnson |
| 2001/0044743 | A1 | 11/2001 | McKinley et al. |
| 2001/0047294 | A1 | 11/2001 | Rothschild |
| 2002/0010627 | A1 | 1/2002 | Lerat |
| 2002/0013727 | A1 | 1/2002 | Lee |
| 2002/0026355 | A1 | 2/2002 | Mitsuoka et al. |
| 2002/0026361 | A1 | 2/2002 | Blom |
| 2002/0030100 | A1 | 3/2002 | Katayanagi et al. |
| 2002/0032771 | A1 | 3/2002 | Gledje |
| 2002/0035474 | A1 | 3/2002 | Alpdemir |
| 2002/0059387 | A1 | 5/2002 | Wolfe |
| 2002/0060246 | A1 | 5/2002 | Gobburu et al. |
| 2002/0065713 | A1 | 5/2002 | Awada et al. |
| 2002/0091569 | A1 | 7/2002 | Kitaura et al. |
| 2002/0091571 | A1 | 7/2002 | Thomas et al. |
| 2002/0095333 | A1 | 7/2002 | Jokinen et al. |
| 2002/0107027 | A1 | 8/2002 | O'Neil |
| 2002/0128904 | A1 | 9/2002 | Carruthers et al. |
| 2002/0128908 | A1 | 9/2002 | Levin et al. |
| 2002/0143630 | A1 | 10/2002 | Steinman et al. |
| 2002/0152133 | A1 | 10/2002 | King et al. |
| 2002/0165849 | A1 | 11/2002 | Singh et al. |
| 2002/0184080 | A1 | 12/2002 | Murad et al. |
| 2003/0004802 | A1 | 1/2003 | Callegari |
| 2003/0004808 | A1 | 1/2003 | Elhaoussine et al. |
| 2003/0007643 | A1 | 1/2003 | Ben-Zur et al. |
| 2003/0018516 | A1 | 1/2003 | Ayala et al. |
| 2003/0018558 | A1 | 1/2003 | Heffner et al. |
| 2003/0028451 | A1 | 2/2003 | Ananian |
| 2003/0032409 | A1 | 2/2003 | Hutcheson et al. |
| 2003/0050863 | A1 | 3/2003 | Radwin |
| 2003/0074251 | A1 | 4/2003 | Kumar et al. |
| 2003/0074259 | A1 | 4/2003 | Slyman, Jr. et al. |
| 2003/0101024 | A1 | 5/2003 | Adar et al. |
| 2003/0101449 | A1 | 5/2003 | Bentolila et al. |
| 2003/0126250 | A1 | 7/2003 | Jhanji |
| 2003/0171962 | A1 | 9/2003 | Hirth et al. |
| 2003/0172007 | A1 | 9/2003 | Helmolt et al. |
| 2003/0229502 | A1 | 12/2003 | Woo |
| 2004/0019540 | A1 | 1/2004 | William et al. |
| 2004/0019541 | A1 | 1/2004 | William et al. |
| 2004/0111315 | A1 | 6/2004 | Sharma et al. |
| 2004/0194052 | A1 | 9/2004 | Hoffschulz et al. |
| 2005/0021403 | A1 | 1/2005 | Ozer et al. |
| 2005/0028188 | A1 | 2/2005 | Latona et al. |
| 2005/0078660 | A1 | 4/2005 | Wood |
| 2005/0101332 | A1 | 5/2005 | Kotzin |
| 2005/0102272 | A1 | 5/2005 | Kumar et al. |
| 2005/0114829 | A1 | 5/2005 | Robin et al. |
| 2005/0177419 | A1 | 8/2005 | Choi et al. |
| 2005/0193036 | A1 | 9/2005 | Phillips et al. |
| 2005/0194431 | A1 | 9/2005 | Fees et al. |
| 2005/0197887 | A1 | 9/2005 | Zuerl et al. |
| 2005/0197918 | A1 | 9/2005 | Wittmer et al. |
| 2005/0215238 | A1 | 9/2005 | Macaluso |
| 2005/0228754 | A1 | 10/2005 | Pezzaniti et al. |
| 2005/0245246 | A1 | 11/2005 | Munch et al. |
| 2005/0246394 | A1 | 11/2005 | Neri |
| 2005/0256759 | A1 | 11/2005 | Acharya et al. |
| 2005/0278296 | A1 | 12/2005 | Bostwick |
| 2006/0074769 | A1 | 4/2006 | Looney et al. |
| 2006/0080135 | A1 | 4/2006 | Frank et al. |
| 2006/0080171 | A1 | 4/2006 | Jardins et al. |
| 2006/0085253 | A1 | 4/2006 | Mengerink et al. |
| 2006/0085517 | A1 | 4/2006 | Kaurila |
| 2006/0141428 | A1 | 6/2006 | Herrod et al. |
| 2006/0178932 | A1 | 8/2006 | Lang |
| 2006/0212350 | A1 | 9/2006 | Ellis et al. |
| 2006/0223495 | A1 | 10/2006 | Cassett et al. |
| 2006/0224437 | A1 | 10/2006 | Gupta et al. |
| 2007/0005647 | A1 | 1/2007 | Cugi et al. |
| 2007/0022009 | A1 | 1/2007 | Cataldi et al. |
| 2007/0026871 | A1 | 2/2007 | Wager |
| 2007/0060099 | A1 | 3/2007 | Ramer et al. |
| 2007/0061229 | A1 | 3/2007 | Ramer et al. |
| 2007/0094042 | A1 | 4/2007 | Ramer et al. |
| 2007/0100963 | A1 | 5/2007 | Ban et al. |
| 2007/0106520 | A1 | 5/2007 | Akkiraju et al. |
| 2007/0130005 | A1 | 6/2007 | Jaschke |
| 2007/0192715 | A1 | 8/2007 | Kataria et al. |
| 2007/0198339 | A1 | 8/2007 | Shen et al. |
| 2007/0208619 | A1 | 9/2007 | Branam et al. |
| 2007/0239518 | A1 | 10/2007 | Chung et al. |
| 2008/0004884 | A1 | 1/2008 | Flake et al. |
| 2008/0010137 | A1 | 1/2008 | Ho et al. |
| 2008/0082412 | A1 | 4/2008 | Tallyn et al. |
| 2008/0097851 | A1 | 4/2008 | Bemmel et al. |
| 2008/0104637 | A1 | 5/2008 | Rodriguez et al. |
| 2008/0126515 | A1 | 5/2008 | Chambers et al. |
| 2008/0147478 | A1 | 6/2008 | Mall et al. |
| 2008/0228583 | A1 | 9/2008 | MacDonald et al. |
| 2009/0029721 | A1 | 1/2009 | Doraswamy |
| 2009/0070129 | A1 | 3/2009 | Inbar et al. |
| 2009/0150215 | A1 | 6/2009 | Kalb et al. |
| 2009/0157512 | A1 | 6/2009 | King |
| 2009/0222329 | A1 | 9/2009 | Ramer et al. |
| 2009/0265245 | A1 | 10/2009 | Wright |
| 2009/0271255 | A1 | 10/2009 | Utter et al. |
| 2009/0292608 | A1 | 11/2009 | Polachek |
| 2010/0082422 | A1 | 4/2010 | Heilig et al. |
| 2010/0082429 | A1 | 4/2010 | Samdadiya et al. |
| 2010/0222035 | A1 | 9/2010 | Robertson et al. |
| 2011/0082939 | A1 | 4/2011 | Montemurro et al. |
| 2011/0131109 | A1 | 6/2011 | Pappas et al. |
| 2011/0258049 | A1 | 10/2011 | Ramer et al. |
| 2011/0270687 | A1 | 11/2011 | Bazaz |
| 2012/0072271 | A1 | 3/2012 | Dessert et al. |
| 2012/0179536 | A1 | 7/2012 | Kalb et al. |
| 2013/0018714 | A1 | 1/2013 | George |
| 2013/0211941 | A1 | 8/2013 | Hallowell et al. |
| 2013/0304586 | A1 | 11/2013 | Angles et al. |
| 2013/0331027 | A1* | 12/2013 | Rose .................. H04W 12/06 |
| | | | 455/41.1 |
| 2014/0080467 | A1 | 3/2014 | Urbanek |
| 2014/0278953 | A1* | 9/2014 | Ismail ............... G06Q 30/0251 |
| | | | 705/14.49 |
| 2015/0074204 | A1 | 3/2015 | Burcham et al. |

OTHER PUBLICATIONS

Advisory Action dated Sep. 22, 2010, U.S. Appl. No. 11/558,021, filed Nov. 9, 2006, 3 pages.

Office Action dated Jun. 13, 2013, U.S. Appl. No. 11/558,021, filed Nov. 9, 2006.

Final Office Action dated Dec. 26, 2013, U.S. Appl. No. 11/558,021, filed Nov. 9, 2006.

(56) References Cited

OTHER PUBLICATIONS

Advisory Action dated Feb. 20, 2014, U.S. Appl. No. 11/558,021, filed Nov. 9, 2006, 3 pages.
Examiner's Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action date Aug. 5, 2014, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, Informs.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?," http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, Application Serial No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.
Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Office Action—Restriction requirement dated Jun. 17, 2008, U.S. Appl. No. 11/405,195, filed Apr. 17 2006, 7 pages.
Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Advisory Action dated Oct. 14, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.

(56) References Cited

OTHER PUBLICATIONS

Notice of Allowance dated Oct. 26, 2009, U.S. Appl. No. 11/433,301, filed May 12, 2006, 7 pages.
Notice of Allowance dated Mar. 5, 2012, U.S. Appl. No. 12/686,188, filed Jan. 12, 2010.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.

Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Decision on Appeal dated Apr. 28, 2015, U.S. Appl. No. 11/438,540, filed May 22, 2006.
Office Action dated Feb. 25, 2015, U.S. Appl. No. 11/474,880, filed Jun. 26, 2006.
Final Office Action date Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed on Jan. 21, 2014, U.S. Appl. No. 14/160,196.
Burcham, Robert H., et al., entitled "Client Mediation and Integration to Advertisement Gateway," filed on Jan. 21, 2014, U.S. Appl. No. 14/160,206.
Burcham, Robert H., et al., entitled "Address Modification for Advertisement Mediation," filed on Jan. 21, 2014, U.S. Appl. No. 14/160,215.
Burcham, Robert H., et al., entitled "Advertisement Mediation of Supply-Demand Communications," filed on Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Advisory Action dated Oct. 29, 2015, U.S. Appl. No. 11/474,880 filed Jun. 26, 2006.
Supplemental Advisory Action dated Nov. 2, 2015, U.S. Appl. No. 11/474,880 filed Jun. 26, 2006.
Office Action date Dec. 17, 2015, U.S. Appl. No. 11/557,939 filed Nov. 8, 2006.
FAIPP Pre-Interview Communication dated Nov. 18, 2015, U.S. Appl. No. 14/024,629, filed Sep. 11, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed on Jan. 9, 2014.
First Action Interview Office Action dated Dec. 17, 2015, U.S. Appl. No. 14/494,601, filed Sep. 24, 2014.

* cited by examiner

METHODS AND SYSTEMS OF GENERATING A UNIQUE MOBILE DEVICE IDENTIFIER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Tracking mobile devices may be used to generate marketing and/or product information about a user of mobile device. Businesses and/or advertisers may use the marketing and/or product information to advertise products to the particular user. As mobile device functionality increases, business and/or advertisers may better target particular users based on their mobile device usage.

SUMMARY

A method of generating a user identifier is disclosed. The method comprises identifying, by a client, that the client does not have a device identifier associated with the device, wherein the device identifier is a device system identifier unique to the device. The method also comprises requesting, by the client, the device identifier from the device in response to identifying that the client does not have the device identifier. The method further comprises receiving, by the client, the device identifier. The method also comprises masking, by the client, the device identifier with client logic. The method further comprises generating, by the client, the user identifier based on masking, wherein the user identifier is unique to the device, and wherein the user identifier is attached to one or more interactions with one or more applications used by the device.

A method of providing an identifier is disclosed. The method comprises identifying, by a proxy, a record of one or more interactions with one or more applications used by a device, wherein a user identifier is attached to the record, and wherein the user identifier is a device system identifier unique to the device. The method also comprises obtaining, by the proxy, the record of the one or more interactions with the one or more applications used by the device with the attached user identifier. The method further comprises masking, by the proxy, the user identifier with a date to generate an information identifier. The method comprises providing, by the proxy, the record of the one or more interactions with one or more application used by the device to one or more suppliers, wherein the information identifier is attached to the record replacing the user identifier.

A method of classifying a device user is disclosed. The method comprises detecting, by a classification application, a first set of one or more interactions with one or more applications on a device, wherein the first set of one or more interactions are detected by the classification application through a network interface. The method also comprises identifying, by the classification application, a pattern of detecting one or more of the same interactions of the first set of one or more interactions with the one or more applications on the device. The method further comprises generating, by the classification application, a token based on the pattern of detecting the one or more same interactions. The method comprises attaching, by the classification application, the token to a record of a second set of one or more interactions with the one or more applications on the device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
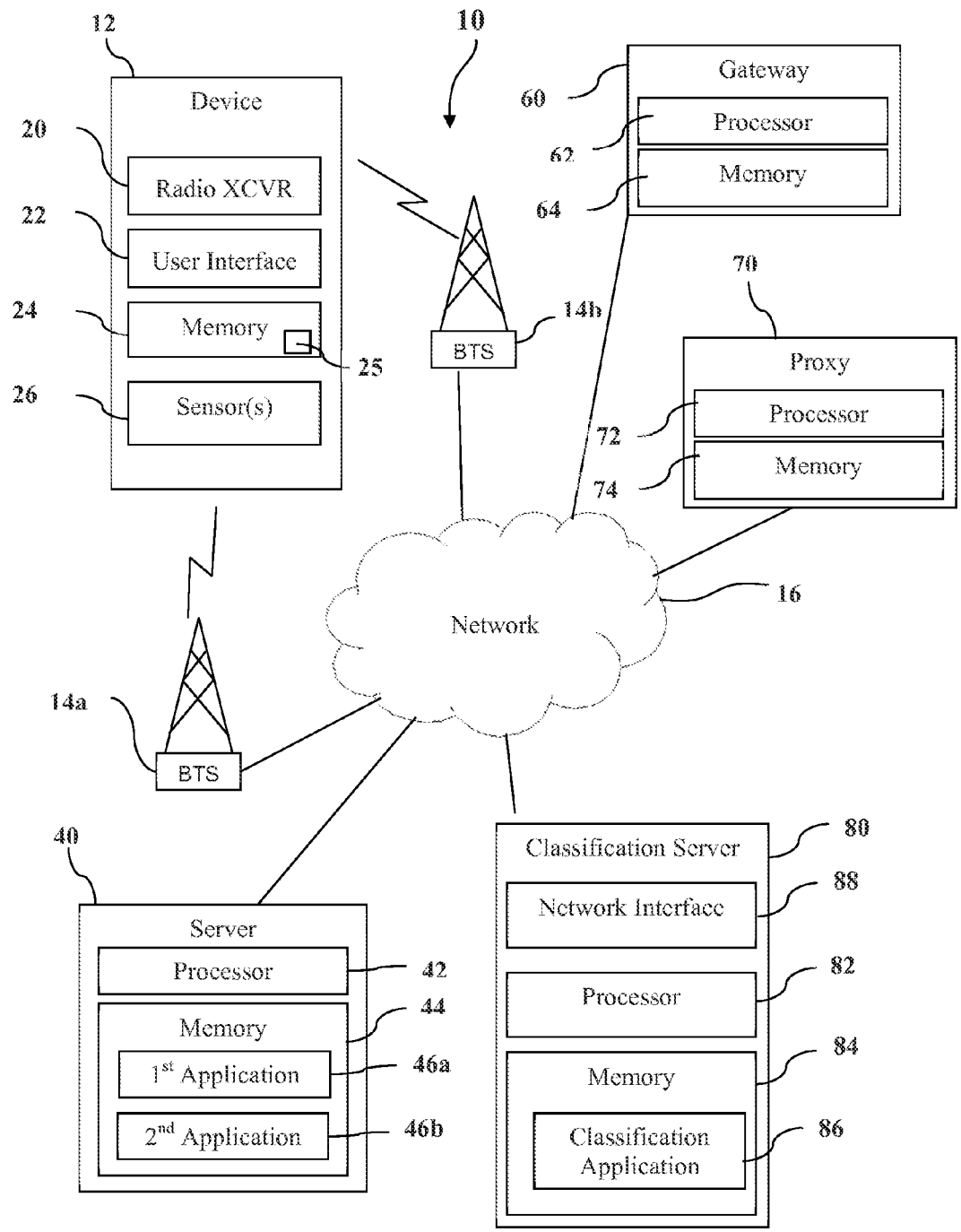
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure comprises a system for masking device identifiers. Devices may be configured with a plurality of sensors for measuring interactions between a mobile device user and a mobile device. Sensors may comprise three-dimensional accelerometers, magnetic field sensors, GPS sensors, trilateration sensors, and/or any type of sensor by which human interaction with a mobile device can be derived. Interactions may comprise locations where a mobile device is stored when the user is not using the mobile device, but in transport with the mobile device, the frequency by which one or more components of the mobile device are used by the user, for example, the user of a keyboard with a particular application at a particular time of day, behavioral patterns of a device users such as particular route which a mobile device user drives every day, one or more stores that a mobile device user frequents regularly, for what purposes does a mobile device user use an application (i.e. electronic wallet), and/or the like.

These interactions may be stored, retrieved, and processed to classify device users based on their particular interactions with their devices. These interactions may be stored and transmitted from a mobile device using a client stored on the mobile device. The client may be produced using a software development kit by a network service provider. The client may be embedded within an application associated with the network service provider (e.g. an electronic wallet) and/or the client may have been installed on the mobile device before the mobile device was purchased. The client may assign a user identifier to a device based on a device identifier. The user identifier may mask a device identifier, for example, by hashing, encryption, the use of a look-up table and/or the like. Hashing may be completed using a one-way secure cryptographic hash function, for instance one of MD5, SHA-0, SHA-1, SHA-2, SHA-3, or other well-known one-way secure cryptographic hash functions. Hereinafter, a one-way secure cryptographic hash function may be referred to more concisely as a hash function or a hashing function.

The client may store an entry in a data store that associates the device identifier and the masked value. In an embodiment, the entry in the data store may be used to map from the masked value to the device identifier. By masking the device identifier through the creation of the user identifier, a network provider obtains an extra level of security so that advertisers may not identify the actual mobile devices which may be receiving messages from the advertisers. When one or more interactions are stored on the mobile device, the mobile device may transmit those interactions with the user identifier to a classification server for classification. The classification server may classify the user identifier with one or more other user identifier based on received and or stored interaction identifiers associated with the user identifier.

In an embodiment, the classification server may also determine if the user identifier is associated with a network identifier. The network identifier may comprise profile information associated with a mobile device owner and/or user for example, provided by the owner and/or user. Network identifiers may be linked to profile data such as age, gender, location of residency, and/or the like. Profile data may comprise any information which a mobile device owner and/or user may provide to a service provider for example, when they are purchasing mobile service. Generally, mobile device owners and/or users associated with a network identifier may have provided profile data to the network provider associated with a client stored on the mobile device, for example, a client that was embedded on the device before the device was purchased, when the owner and/or user of the mobile device purchased the mobile device and/or mobile service from the network service provider. Alternatively and/or additionally, mobile device owners and/or users associated with a network identifier may have provided profile data when an application with an embedded client associated with the network service provider was installed on their device.

Regardless of whether the user identifier is associated with a network identifier, interaction identifier(s) associated with a user identifier may be transmitted to a gateway and then to a proxy. At the proxy, the interaction identifier and the associated user identifier may be masked with an expiration date, for example by using encryption, a one-way secure hash function, a look-up table, and/or the like. The proxy and/or the gateway may then transmit the interaction identifier and the associated user identifier masked with the expiration date to an advertiser so that the advertiser may send a message and/or advertisement to a mobile device associated with the user identifier based on the interaction identifiers with revealing the actual identity of the mobile device user associated with the masked user identifier and expiration date.

The interaction identifier and the associated user identifier may be masked with a date so that advertisers may not identify the actual devices associated with the user identifier. Thus, the advertisers may be sending advertisements back to the proxy (or a receiving proxy) of the network provider where the network provider may then unmask the interaction identifier and the associated user identifier from the expiration date and send the message to the associated mobile device users. This feature may be used to protect mobile device users so that advertisers do not discover the actual identity and/or address of the mobile device receiving messages as the network provider will be the only entity which can unmask the interaction identifier and the associated user identifier from the expiration date to identify the user identifier.

Furthermore, the interaction identifier and the associated user identifier may be masked with a date so that each time a particular mobile device's masked user identifier and date are given to an advertiser to masked user identifier and date will be different. For example, a mobile device with a particular user identifier may be sent to an advertiser on May 1, 2013. Because the user identifier is masked with the date May 1, 2013, the masked user identifier and date may generate a first masked user identifier and date. Subsequently, the same mobile device with the particular user identifier may be sent to an advertiser again on May 15, 2013. Because the user identifier is masked with a different date, such as May 15, 2013, the masked user identifier and date may generate a second masked user identifier and date which is different from the first masked user identifier and date. Thus, advertisers may never know specifically which mobile device are receiving messages. Furthermore, if an advertiser is sending multiple rounds of message on different dates, advertisers may never know if any one of the mobile devices receiving a message in a subsequent round of message transmissions has previously received a message in an earlier round.

Turning now to FIG. 1, a communication system 10 is described. The system 10 may comprise a device 12, base transceiver station(s) (BTS) 14a and/or 14b, a network 16, a server 40, and a network interface 50, a gateway 60, a proxy 70, and a classification server 80. In an embodiment, the communication system 10 may be configured to generate a unique user identifier for a particular device. Unique user identifiers may allow for the tracking and classifying of activities of a plurality of device users regardless of the type of device being tracked and/or classified or the service provider providing data services and/or telephonic services. For example, a first device may be an Android mobile device while a second device may be an HP® personal computer. However, when a user identifier is generated for each device, activities carried out by device users using each device may be tracked in the same and/or similar way so that when the first device and the second device are classified into one or more categories and/or groups, the devices may be clustered if they share at least one common category.

In an embodiment, the communication system 10 may also be configured to classify devices and thus the users of the devices by tracking activities/interactions between the device user(s) and the device. Based on the activities/interactions between the device user(s) and the device, a device may be classified with other devices whose users have carried out the same and/or similar activities/interactions. In an embodiment, devices may be classified for the purpose of providing targeted advertising and/or notifications. However, device owners and/or users may not want advertisers for example to know their specific activities and/or behaviors. Thus, the communication system 10 may be configured to mask a device identifier as well as a user identifier in order to protect a device and/or device users from personal identifier by advertisers.

The server 40 may comprise a processor 42, a memory 44, and a plurality of applications, such as the first application 46a and the second application 46b. The applications 46 may be configured to receive and send data messages from and/or to a mobile device and/or a computer terminal as is well known in the art. The server 40 may also comprise a plurality of processors located in a plurality of computers. Computers are discussed in more detail hereinafter.

The device 12 may be a computer and/or a mobile device. Mobile devices may comprise a mobile phone, a personal digital assistant (PDA), a media player, or other communication enabled portable electronic device. In an embodiment, mobile devices may be implemented as a handset. Details of handsets are discussed further hereinafter. The base transceiver stations 14a and 14b may provide a communication link to the device 12. For example, as shown in FIG. 1, the base transceiver stations 14a and 14b couple the device 12 to the network 16. In an embodiment, the base transceiver stations 14a and 14b provide wireless communication links to the device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14a and 14b are illustrated in FIG. 1, it is understood that the communication system 10 may comprise two or more base transceiver stations 14 and any number of devices 12. Alternatively, the device 12 may be connected to the network via a wire line, through a Wi-Fi connection, and/or the like. The network 16 may be a public communication network, a private communication network, or a combination thereof.

The device 12 may comprise a radio transceiver 20, a user interface 22, and a memory 24. Alternatively, the device 12 may comprise two or more radio transceivers 20. In an embodiment, the memory 24 may store one or more data package(s), applications, and/or clients, such as client 25. The client 25 may be associated with a network (e.g. Sprint) providing the network interface 50, the gateway 60, the proxy 70, and/or the classification server 80, to be discussed further herein. The client 25 may generate a user identifier identifying the particular mobile device with a message transmitted from the mobile device to an application on a server such as applications 46a and/or 46b on server 40. In an embodiment the client 25 may be embedded in an application associated with a network. For example, the client 25 may be an electronic wallet application associated with Sprint®. Because the electronic wallet application comprises the client 25, any message transmitted by the mobile device through the electronic wallet may comprise a user identifier masked for example using a one-way reverse hash function, encryption, a look-up table, and/or the like by the client 25 which may be linked to one or more interaction identifiers also attached to the transmitted message. In an embodiment, the client 25 may have been installed before the mobile device was purchased so that any message transmitted by the mobile device may comprise a masked user identifier which may be linked to one or more interaction identifiers attached to the transmitted message.

The client 25 may be configured to generate a user identifier unique to the device that the client 25 is located on. For example, the client 25 may be downloaded by a mobile device owner to the owner's mobile device. In an embodiment, the client 25 may have been previously installed on the mobile device, for example, by a manufacturer, before the mobile device was purchased. Once the client 25 is located on the mobile device, the client 25 may identify that the client 25 does not have a device identifier associated with the mobile device. Thus, the client 25 may request from the device 12 a device identifier which may be a device system identifier unique to the mobile device 12. For example, the mobile device may be an Android mobile device with a JAVA DM specifically for the Android phone. The client 25 may request a device identifier and in response receive a unique Android system identifier which is unique to that particular mobile device. Using the unique Android system identifier, the client may mask the unique system identifier with client logic using, for example, using a one-way secure hash function, encryption, and/or a look-up table to generate a user identifier unique to the mobile device. In an embodiment, masking the user identifier unique to the device hides and/or protects the user identifier from advertisers. Once the user identifier has been generated the user identifier may be tied to a network identifier (e.g. to provide profile data associated with the owner and/or user of the mobile device) of network associated with the client (i.e. a Sprint® ID), an independent identifier (e.g. an identifier provided by a third party, and/or a network identifier of another network unassociated with the client (i.e. AT&T®, Verizon, etc.).

It should also be understood that the client logic may be based on the type of container the client is operating in on the device. For example, the client may be operating in at least one of native scope, a virtual scope, or a web-browser scope on the mobile device. Furthermore, the client logic may be configured to secure the user identifier and/or persist the user identifier after the user identifier is generated.

In an embodiment, once the user identifier is generated, the user identifier may be cached with a device 12 so that each time the user identifier is needed, for example, when it is attached to message with interaction identifiers, the cached user identifier may be easily obtained and attached. Alternatively, after the user identifier is masked it may be immediately attached to the message for example and then deleted. Thus, when the user identifier is needed a second time, the client 25 may have to generate another user identifier. In an embodiment, when the user identifier is cached, a memory erasing function (i.e. a ##RTN function) may wipe the memory from the device 12 including the user identifier. In an embodiment, where the cached user identifier had been associated with a network identifier, for example, the correct network identifier associated with the device 12 may be identified by the device identifier component of the new masked user identifier. In other words, the device identifier may always be associated with one particular device 12.

The device 12 may also comprise one or more sensors(s) 26. The sensor(s) 26 may comprise at least one of a three-dimensional accelerometer, one or more near field communication sensor(s), one or more sensor(s) communicating with the mobile device for example, via a wireless communications protocol such as Bluetooth® and/or Zigbee®, a rate sensor such as a gyroscope, and/or the like. The sensor(s) 26 may also comprise one or more sensor(s) configured to detected, communicate with, and/or receive information from a radio frequency (RF) transceiver, a global positioning system (GPS) receiver, an analog baseband processing unit, a removable memory card, a universal serial bus (USB) port, an infrared port, a vibrator, a keypad, a touch screen liquid crystal display (LCD) with a touch sensitive surface, a touch screen/LCD controller, a camera, and/or the like installed in the device 12.

The sensor(s) 26 may be used to detect interactions between a device user and for example, a mobile device. For example, sensor(s) 26 may detect frequent use of a keypad on the mobile device, that a mobile device user prefers to access one or more services through an application instead of through a browser, that the mobile device user frequents particular geographic locations and/or stores (i.e. a type of spatial orientation of the mobile device), that the mobile device user travels a particular route and/or at a particular time to one or more geographic locations and/or stores (i.e. a type of movement of mobile device), that a mobile device user exclusively uses an electronic wallet installed on the mobile device at particular times (i.e. a type of frequency of use), for purchasing at particular stores (i.e. a type of mobile device use), and/or for purchasing particular products and/or services, that the mobile device user holds the mobile device in the morning and/or evening but stores the mobile device in a pocket during the day (i.e. another type of spatial orientation of the mobile device), that the mobile device user utilizes Wi-Fi at a particular time and/or with one or more particular applications, but utilizes mobile broadband access at another time and/or with one or more other applications, and/or the like. The sensor(s) 26 may be linked wirelessly or by a physical wire to a remote sensor for example to measure body temperature, blood pressure, a heart rate, inside and/or outside humidity, wind speed, tire pressure, and/or the like. The data collected by the sensor(s) may then be processed by a processing unit on the mobile device and assigned one or more interaction identifiers based on one or more particular interactions.

The device 12 may store, for example, in the memory 24 a plurality of interaction identifiers which may be used to identify one or more sensed interactions. The mobile device may attach one or more interaction identifier to one or more message(s) (e.g. a request message to access an application located on a server) which are transmitted through the network 16 to an application, such as application(s) 46a and/or 46b, on a server 40 in communication with the network 16. In an embodiment, interaction identifiers may be attached to the next message transmitted by the mobile device. Alternatively, interaction identifiers may accumulate until a predetermined amount of interaction identifiers have accumulated so that a set of interaction identifiers may be sent together with one message. In an embodiment, interaction identifiers may accumulate in the memory of the mobile device until off-peak-hours occur in order to mitigate the amount of data traffic by reducing the message size during the peak data transfer hours. In an embodiment, the sensor(s) 26 may detect one or more message(s) being sent by the mobile device to an application and attach an interaction identifier identifying the one or more characteristics of the message. In an embodiment, the mobile device may attach the interaction identifier identifying the message with the message being sent and/or may attach the interaction identifier identifying the message to a subsequent message to be sent.

In addition to sending interaction identifier, the device 12 may also attach the user identifiers with the interaction identifiers to one or more messages. As previously discussed, user identifiers may be used to identify a user based on their mobile device. Generally, the user identifiers may not comprise the actual name and/or identifier of the owner and/or user of the mobile device. In an embodiment, the user identifier(s) and/or the interaction identifier(s) may be used to infer a connection to an identified network even where an express connection has not yet been made.

For example, a client 25 may be stored on a mobile device 12. The mobile device user may have been carrying her mobile device while she went for a 45 minute run. Her mobile device may have sensed a continuous up and down motion as well as a continuous forward motion for a 45 minute time duration sensed by the mobile device's three-dimensional accelerometer. Her mobile device may associate one or more interaction identifier(s) with the continuous up and down motion for 45 minutes over a period of time (e.g. from 5:30 am to 6:15 am on Friday Apr. 19, 2013) and may attach the interaction identifier(s) as well as a user identifier to a message to be sent to an application, such as the first application 46a on the server 40 located in the network 16. As will be discussed further herein, the classification server 80 may receive, for example via a network interface 88, the transmitted message on its way to an application 46a and/or 46b located on the server 40 and classify a user identifier attached to the message based on the one or more interaction identifiers associated with it. As shown in FIG. 1, the classification server 80 may comprise a processor 82, a memory 84, and the network interface 88. The memory 84 may comprise a classification application 86 to facilitate the classification process. The classification server 80 may then transmit the classified user identifier to the gateway 60 so that the proxy 70 may obtain the classified user identifier and mask the classified user identifier with a date to encrypt user identifier before transmitting the encrypted user identifier to one or more suppliers.

In an embodiment, the mobile device 12 may utilize multiple different sensors to identify a plurality of interaction identifier for user identifier classification. For example, a three-dimensional accelerometer may sense that the runner's mobile device is continuously moving up and down as well as continuously moving forward for the 45 minute duration. However, while this movement alone may indicate that the mobile device user was running, it may also indicate that the mobile device user was in an automobile moving on an uneven road. Thus, the mobile device may utilize trilateration and/or GPS to sense additional interactions so that the classification server 80 may associate the interactions accurately, for example by associating the sensed interactions with a common duration and/or period of time. For example, by utilizing trilateration and/or GPS, in addition to the three-dimensional accelerometer, and providing a time duration and/or time period associated with each sensed interaction, the mobile device 12 may transmit a plurality of interaction identifier to classification server 80 comprising the classification application 86 so that the classification application 86 may determine the velocity at which the runner was moving, whether she was moving on paved roads verses trails, and/or if the continuous forward movement began at her house and ended at her house within the same period and/or duration of time in order to rule out the possibility that she was in an automobile and precisely identify that she was running. Once the classification application 86 has classified a user identifier based on the one or more interaction identifiers, the classification application 86 may generate a token based on the classification of the one or more interaction identifiers and attach the token to the user identifier and transmit the user identifier to a gateway 60. Furthermore, the message sent from the mobile device 12 may continue on to an application such as application 46a and/or 46b on the server 40.

The classification, by the classification application 86 of user identifiers may be used to alert merchants, groups, providers of services and/or the like to target messages, coupons, advertisements, recommendations, and/or the like to the mobile device which may be related to and/or of interest to moderate runners. Furthermore, the classification application 86 may also cluster devices classified, for example, as a device used and/or owned by a moderate runner with other devices used and/or owned by moderate runners to mass target messages, coupons, advertisements, recommendations, and/or the like to a group of mobile devices which may be used and/or owned by moderate runners.

In an embodiment, the classification application 86 may identify at least one of a similar interaction identifier between two or more user identifiers, identifying at least one of another interaction identifier of the other user identifiers which is different from any interaction identifier of the user identifier, and associating the user identifiers with the different interaction identifier based on the similar interaction identifiers. For example, as previously described the moderate user identifiers may have been classified as a moderate runner profile based on continuously moving up and down as well as continuously moving forward for the 45 minute duration, the velocity by which the runner was moving, moving on trails, identifying that the continuous forward movement began at her house and ended at her house within the same period and/or duration of time. Furthermore another user identifiers while not classified as moderate runner may have an interaction identifier of moving on trails.

Additionally, the other user identifiers may have stored an interaction identifier, for example through the user of an electronic wallet, of buying a particular energy bar, that the user and/or owner associated with the other user identifiers frequently purchases. Conversely, the user identifiers associated with the moderate runner may not have stored an interaction identifier of buying an energy bar. However, because the moderate runner user identifiers and the other user identifiers both have the interaction identifier of moving on trails stored with their user identifiers, the classification application 86 may determine that the moderate runner user identifiers may also have a health food interest and provide advertisers, marketers, merchants, service providers, manufacturers, media, and/or the like to inform the moderate runner about health food and/or energy bars by provide coupons, advertisements, promotional information, news, and/or the like related to health food to the moderate runner's mobile device.

The communication system 10 may also comprise a gateway 60. The gateway 60 may be configured to receive one or more classified user identifiers from one or more classification servers 80. As shown in FIG. 1, the gateway 60 may comprise a processor 62 and/or a memory 64. In an embodiment, the gateway 60 may function much as a holding medium which then transmits the classified user identifier to the proxy 70. The proxy 70 may be configured to mask, for example by encryption, one-way reverse masking, and/or a look-up table, classified user identifiers. Generally, the proxy 70 is associated with the same network that provided the client 25 (e.g. Sprint®). The proxy 70 may mask the classified user identifier with a date thereby preventing the distribution of actual user identifiers to suppliers. Furthermore, the date puts a time limit on how long the masked classified user identifier lasts. For example, a user identifier classified as a moderate runner may be transmitted from the gateway 60 to the proxy 70. The proxy 70 may mask the moderate runner user identifier with a date, for example, a specific date and time, a specific month and year, and/or the like.

The masked moderate runner user identifier may then be transmitted to one or more suppliers so that the supplier may send advertisements, notifications, recommendations, promotions, news updates, and/or the like (i.e. notifications) to the device through a moderator (e.g. the network that provided client 25) associated with the masked moderate runner user identifier in a first round of message transmissions. Because a date has been masked with the moderate runner user identifiers, the suppliers may be able to send the mobile devices 12 associated with the moderate runner classification advertisements, notifications, recommendations, promotions, news updates, and/or the like without knowing which actual mobile device 12 the advertiser is sending message to. Subsequently, an advertiser may want to send more advertisements to one or more mobile devices 12 associated with the moderate runner classification. One or more of the same mobile devices 12 from the first round of message transmission may be selected for receiving message. However, in the second round the user identifiers of the same mobile devices 12 from the first round will be masked with a different date. Thus, the advertiser will not be able to identify which mobile devices 12 are receiving messages including if whether messages are being sent to the same mobile devices 12 in separate rounds. By preventing advertiser and/or suppliers from seeing actual device identifier as well as the user identifier and by only allowing suppliers to send messages to devices through a moderator, the moderator is able to retain information and/or information updates as well as protect the identities of individuals associated with user identifiers and/or device identifier from suppliers.

It should be understood that the masking of the classified user identifier with the date prevents suppliers from knowing which device is associated with the classified user identifier. Thus, in order for the suppliers to send notifications to a mobile device 12, the suppliers must transmit the notifications with the classified user identifiers masked with the date to a receiving proxy associated with the moderator. The receiving proxy may be associated with the same network as the proxy 70. The receiving proxy contains the key to unmask the classified user identifier masked with the date. When the supplier sends an advertisement for example, the user identifier masked with the date is provided with the advertisement so that the advertisement reaches the desired device 12. Thus, when a supplier sends a notification to a mobile device 12 associated with the user identifier comprising the classified user identifier masked with a date, the receiving proxy unmasks the classified user identifier so that the classified user identifier may be delivered to the proper mobile device 12. Additionally, the advertisers and/or suppliers are never able to determine which actual devices are receiving their notifications. In an embodiment, the receiving proxy may be a component of the proxy 70.

Figure 2:
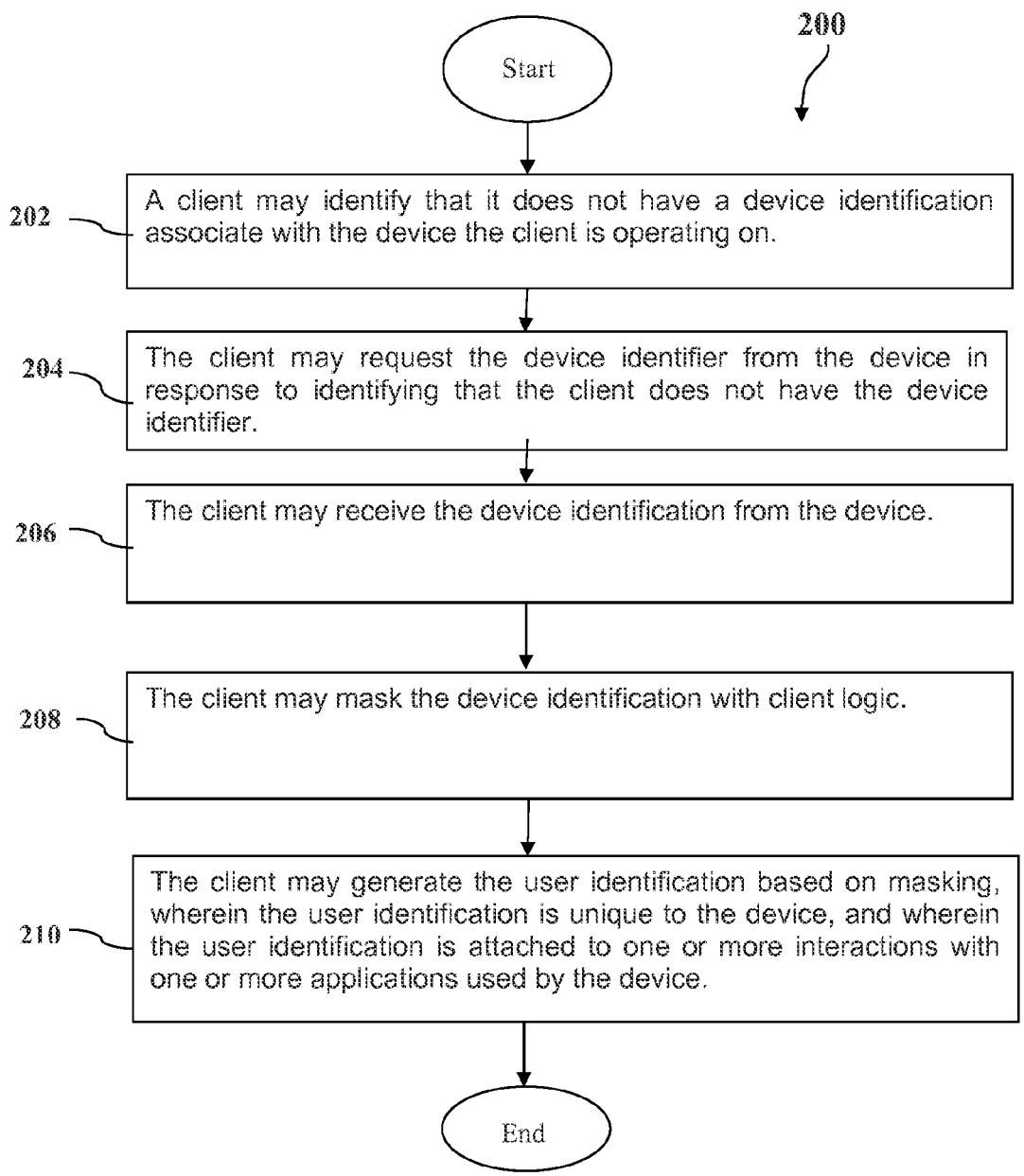
FIG. 2 is a flow chart of a method according to an embodiment of the disclosure.

In FIG. 2, a method 200 is described. At block 202, a client 25 may identify that it does not have a device identifier associated with the device the client 25 is operating on. The device identifier may comprise a device system identifier unique to the device. At block 204, the client 25 may request the device identifier from the device in response to identifying that the client 25 does not have the device identifier. At block 206, the client 25 may receive the device identifier from the device. At block 208, the client 25 may mask the device identifier with client logic. In an embodiment, the client logic may be based on the type of container the client 25 is operating in on the device. For example, the types of containers comprise at least one of a native scope, a virtual scope, or a web-browser scope. Furthermore, the client logic may secure the user identifier and persists the user identifier after the user identifier is generated.

At block 210, the client 25 may generate the user identifier based on masking, wherein the user identifier is unique to the device, and wherein the user identifier is attached to one or more interactions with one or more applications used by the device. In an embodiment, the applications may be associated with the client 25.

In an embodiment, the method 200 may further comprise that the client 25 records the one or more interactions with the one or more client applications, wherein recording comprises associating the one or more interactions with the user identifier and transmits the recorded one or more interaction with the one or more client applications to a gateway associated with the client 25, wherein the gateway coordinates the one or more interactions from the device with interactions of at least one other device. In an embodiment, the method 200 may further comprise that the user identifier is associated with a network identifier. Additionally, in an embodiment, the method 200 may further comprise that the user identifier is cached in the device so that when an interaction with a client application occurs, the client 25 can retrieve the cached user identifier and attach the user identifier to the interaction.

Figure 3:
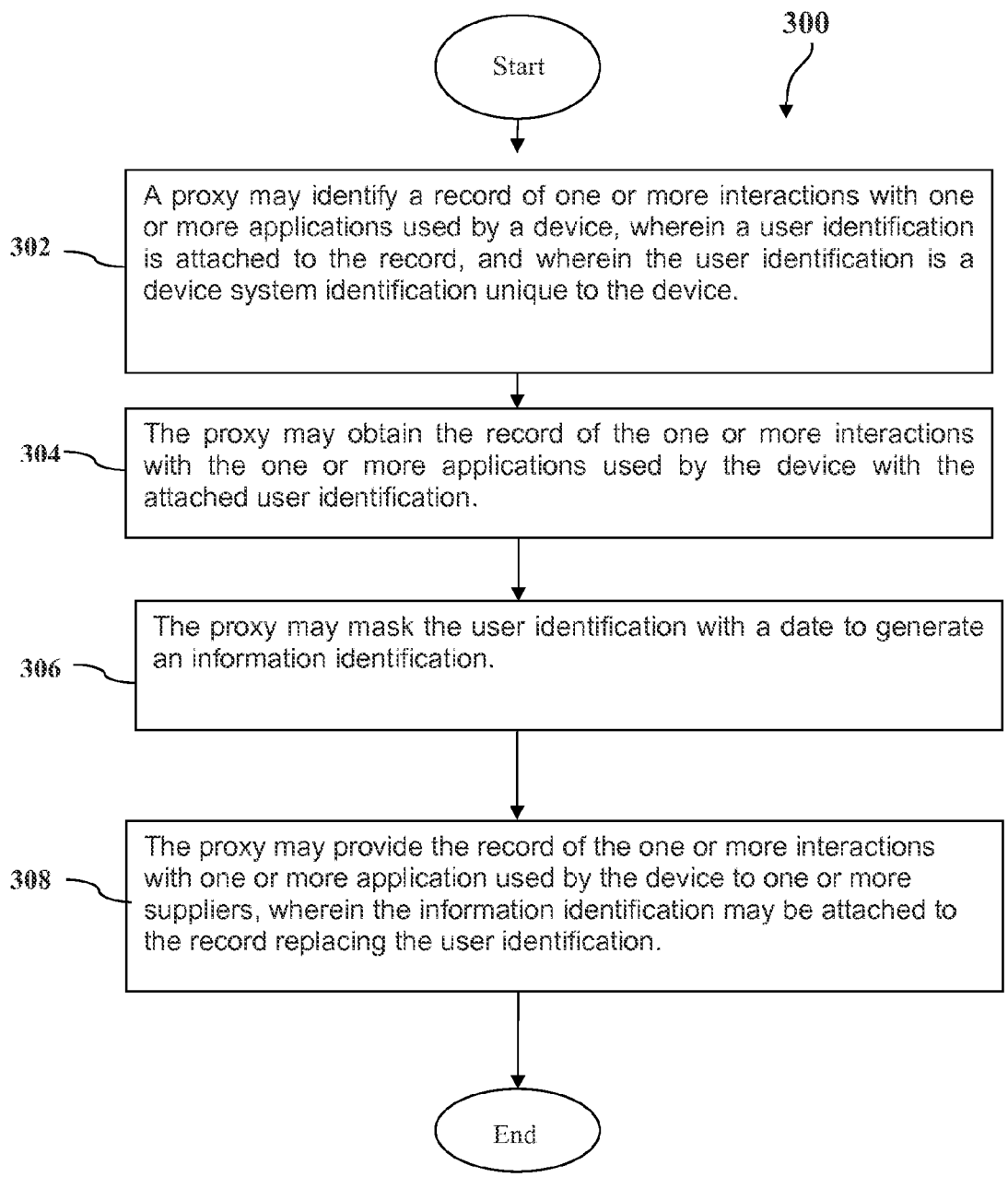
FIG. 3 is a flow chart of a method according to an embodiment of the disclosure.

In FIG. 3, a method 300 is described. At block 302, a proxy may identify a record of one or more interactions with one or more applications used by a device, wherein a user identifier is attached to the record, and wherein the user identifier is a device system identifier unique to the device. In an embodiment, the one or more interactions with one or more applications used by the device comprise an interaction between the device user and the device.

At block 304, the proxy may obtain the record of the one or more interactions with the one or more applications used by the device with the attached user identifier. At block 306, the proxy may mask the user identifier with a date to generate an information identifier. In an embodiment, the date may be a specific data and time, a specific month, and/or the like. In an embodiment, the date may be 30 days from the date the user identifier was masked with the date. In an embodiment, masking the user identifier with the date to generate an information identifier prevents exposure of the user identifier to the one or more suppliers. In an embodiment, the user identifier may be derived by masking a device identifier with logic instructions so that only the proxy is exposed to the user identifier, wherein the device identifier is a device system identifier unique to the device.

At block 308, the proxy may provide the record of the one or more interactions with one or more application used by the device to one or more suppliers, wherein the information identifier may be attached to the record replacing the user identifier. In an embodiment, suppliers may comprise at least one of an advertiser, a marketer, a manufacturer, a service provider, a retailer, or a distributor. In an embodiment, the record of one or more interactions with one or more applications used by a device may be categorized into one or more categories and/or groups so that the record is provided to one or more suppliers related to the one or more categories and/or groups.

In an embodiment, the method 300 may further comprise that a receiving proxy may receive an information data package, such as a notification, with the information identifier attached to the information data package, wherein the information data package comprises information related to the one or more interactions with the one or more application used by the device.

Figure 4:
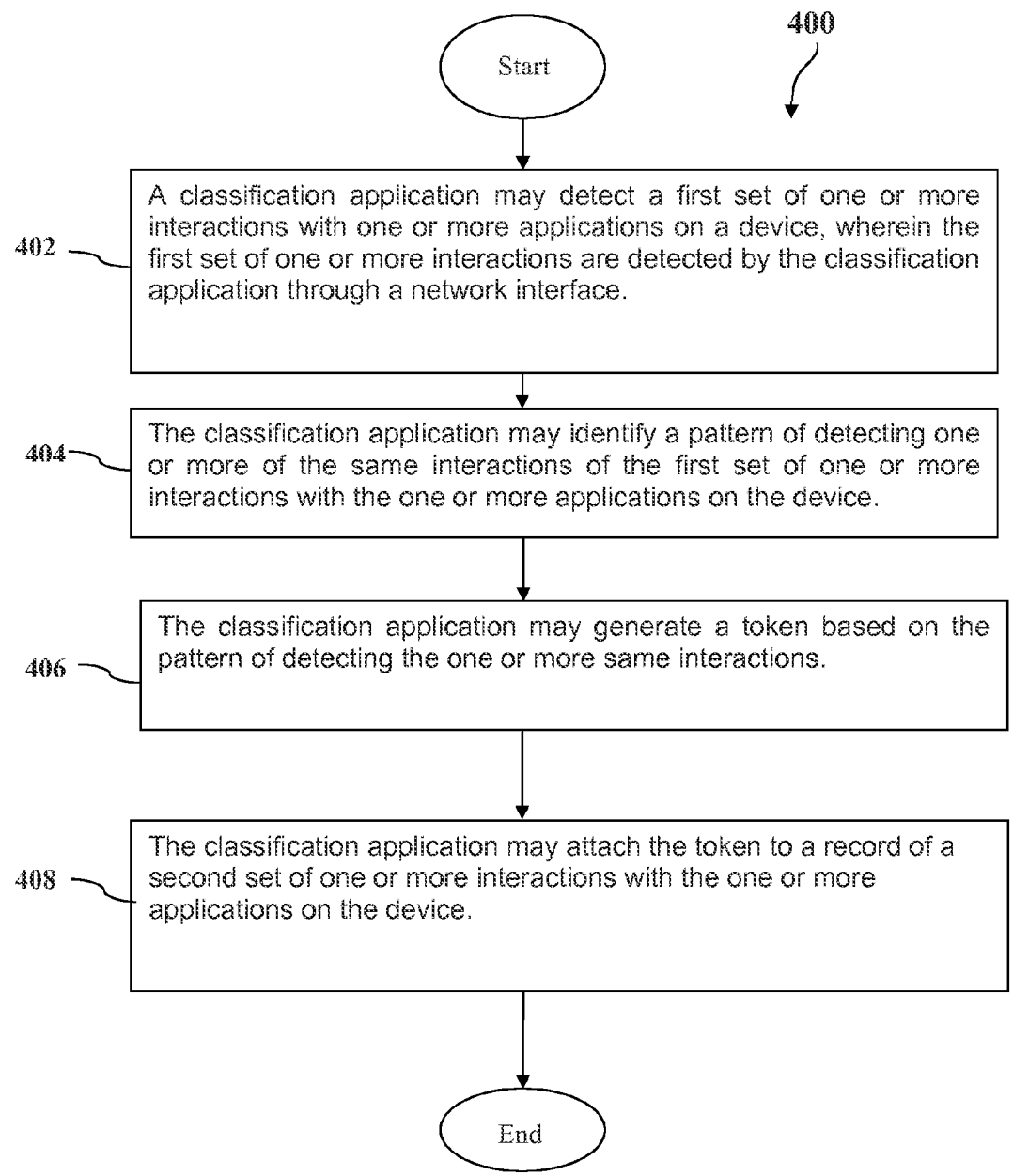
FIG. 4 is a flow chart of a method according to an embodiment of the disclosure.

In FIG. 4, a method 400 is described. At block 402, a classification application may detect a first set of one or more interactions with one or more applications on a device, wherein the first set of one or more interactions are detected by the classification application through a network interface. At block 404, the classification application may identify a pattern of detecting one or more of the same interactions of the first set of one or more interactions with the one or more applications on the device. At block 406, the classification application may generate a token based on the pattern of detecting the one or more same interactions. At block 408, the classification application may attach the token to a record of a second set of one or more interactions with the one or more applications on the device.

The method 400 may further comprise attaching the record of the second set of one or more interactions with the attached token to a message and transmitting the message to a gateway. The method 400 may also comprise masking, for example by encrypting, hashing, through a look-up table and/or the like, the record of the second set of one or more interactions with the attached token before providing the record to a supplier.

Figure 5:
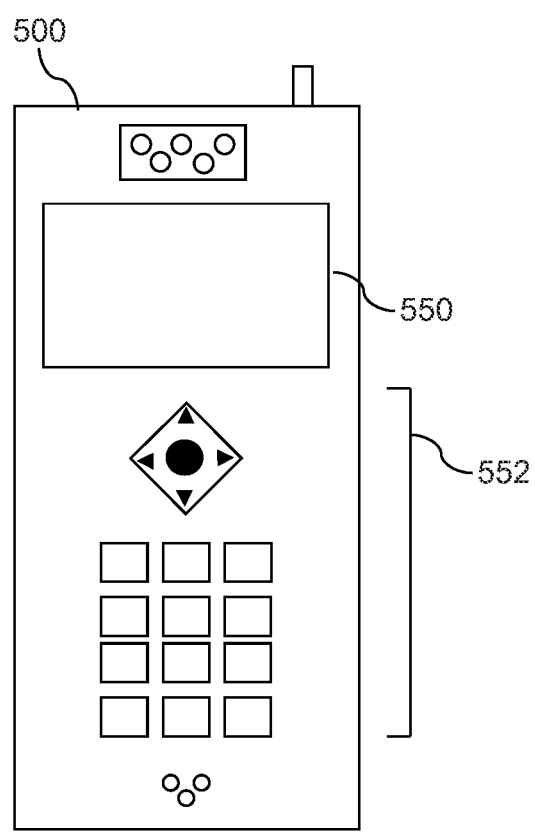
FIG. 5 is an illustration of a mobile device according to an embodiment of the disclosure.

FIG. 5 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 550 to show a web page. The web page may be obtained via wireless communications with a base transceiver station, a wireless network access node, a peer mobile device 500 or any other wireless communication network or system.

Figure 6:
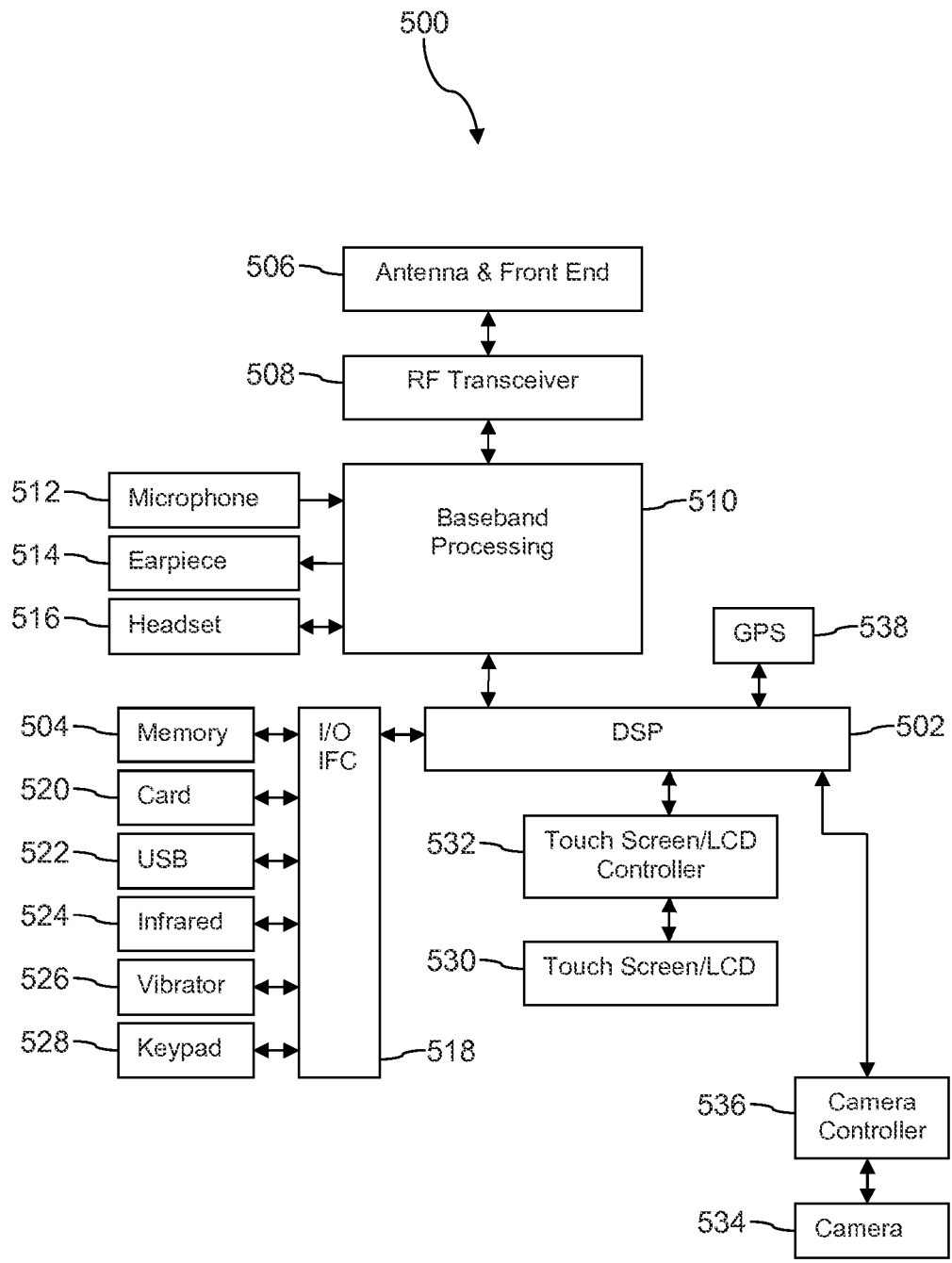
FIG. 6 is a block diagram of a mobile device according to an embodiment of the disclosure.

FIG. 6 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 502 may communicate directly with the memory 504 without passing through the input/output interface 518. Additionally, in an embodiment, the mobile device 500 may comprise other peripheral devices that provide other functionality.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 500 to communicate wirelessly with other nearby handsets and/or wireless base stations.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 500 to determine its position.

Figure 7A:
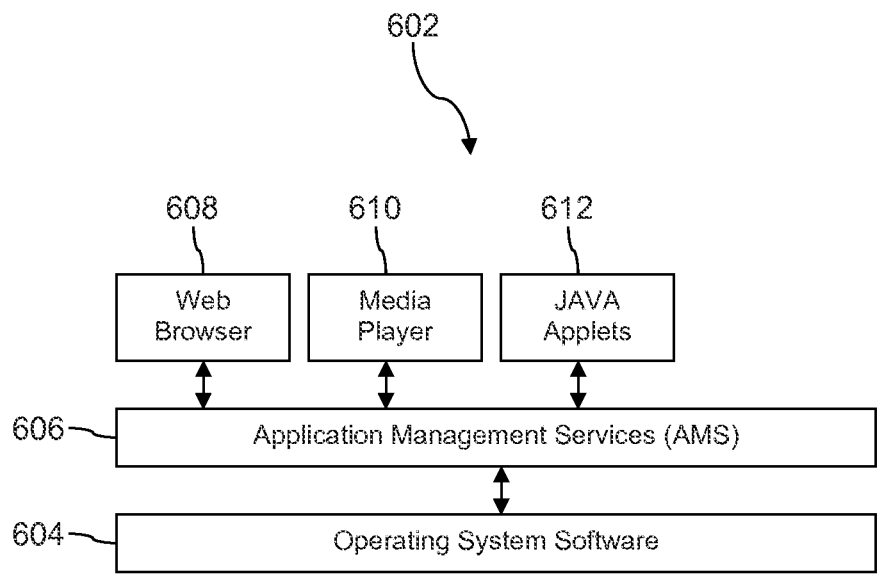
FIGS. 7A and 7B are block diagrams of software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 7A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 7B:
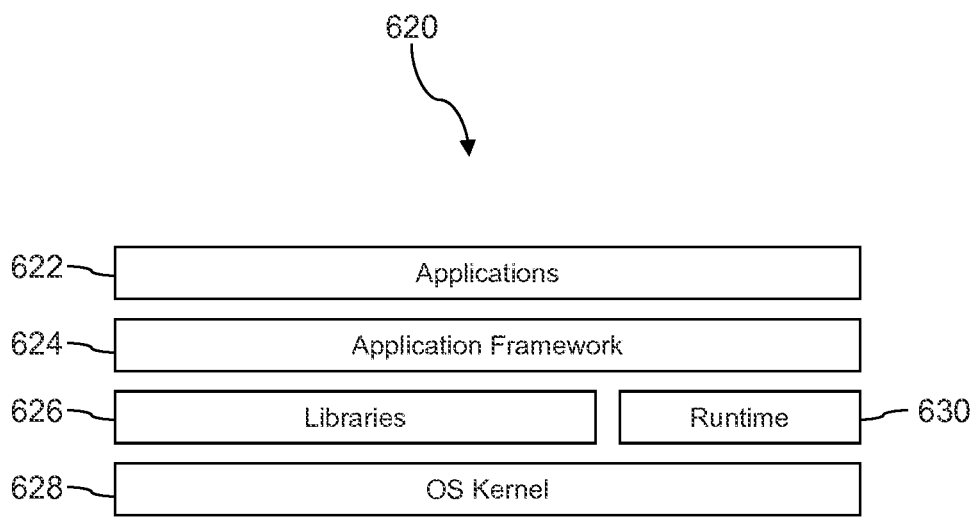

FIG. 7B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
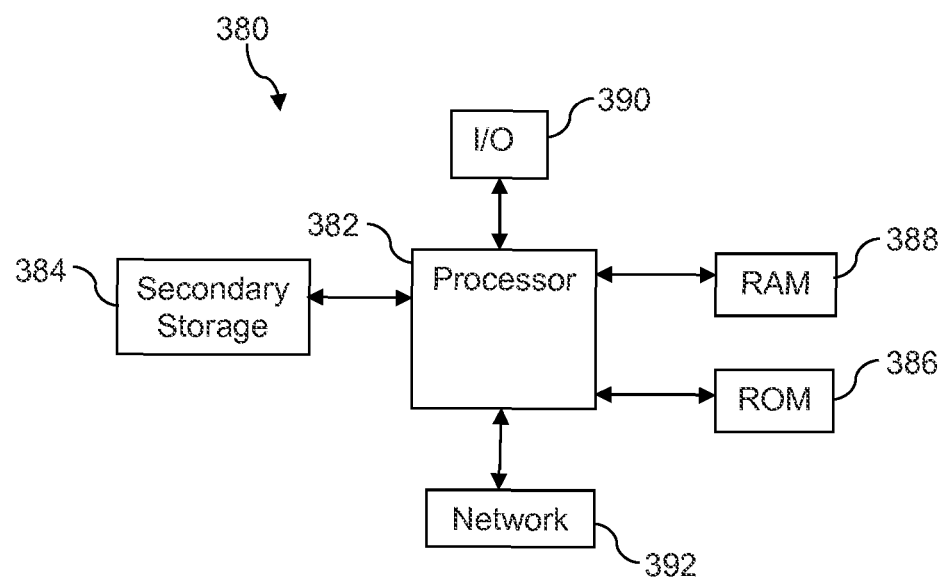
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of generating a user identifier, the method comprising:
    identifying, by a client stored in a memory of a device and executable by a processor of the device, that the client does not have a device identifier associated with the device, wherein the device identifier is a device system identifier unique to the device;
    requesting, by the client, the device identifier from the device in response to identifying that the client does not have the device identifier;
    receiving, by the client, the device identifier;
    masking, by the client, the device identifier with client logic; and
    generating, by the client, the user identifier based on the masking, wherein the user identifier is unique to the device, and wherein the user identifier is attached to one or more interactions with one or more applications used by the device.

2. The method of claim 1, further comprising:
    recording, by the client, the one or more interactions with the one or more applications, wherein recording comprises associating the one or more interactions with the user identifier; and
    transmitting, by the client, the recorded one or more interactions with the one or more client applications to a gateway associated with the client, wherein the gateway coordinates the one or more interactions from the device with interactions of at least one other device.

3. The method of claim 1, wherein the client logic is based on a type of container the client is operating in on the device.

4. The method of claim 3, wherein the type of container comprises a native scope, a virtual scope, or a web-browser scope.

5. The method of claim 1, wherein the client logic secures the user identifier and persists the user identifier after the user identifier is generated.

6. The method of claim 1, wherein at least one of the one or more applications is a client application.

7. The method of claim 1, further comprising associating the user identifier with a network identifier.

8. The method of claim 1, further comprising caching the user identifier in the device so that when an interaction with a client application occurs, the client can retrieve the cached user identifier and attach the user identifier to the interaction.

9. A method of providing an identifier, the method comprising:
    identifying, by a proxy comprising a processor and a memory, a record of one or more interactions with one or more applications used by a device, wherein a user identifier is attached to the record, and wherein the user identifier is a device system identifier unique to the device;
    obtaining, by the proxy, the record of the one or more interactions with the one or more applications used by the device with the attached user identifier;
    masking, by the proxy, the user identifier with a date to generate an information identifier; and
    providing, by the proxy, the record of the one or more interactions with the one or more applications used by the device to one or more suppliers, wherein the information identifier is attached to the record replacing the user identifier.

10. The method of claim 9, further comprising receiving, by the proxy, an information data package with the information identifier attached to the information data package, wherein the information data package comprises information related to the one or more interactions with the one or more applications used by the device.

11. The method of claim 9, wherein the one or more suppliers comprise at least one of an advertiser, a marketer, a manufacturer, a service provider, a retailer, or a distributor.

12. The method of claim 9, wherein masking the user identifier with the date to generate the information identifier ensures that no two user identifier masked with dates are alike.

13. The method of claim 9, wherein masking comprises at least one of using a one-way secure hash function, encryption, or a look-up table.

14. The method of claim 9, wherein the one or more interactions with the one or more applications used by the device comprise an interaction between a device user and the device.

15. The method of claim 9, wherein masking the user identifier with the date to generate the information identifier prevents exposure of the user identifier to the one or more suppliers.

16. The method of claim 15, wherein the user identifier is derived by masking a device identifier with logic instructions so that only the proxy is exposed to the user identifier, wherein the device identifier is the device system identifier unique to the device.

17. The method of claim 9, wherein the record of the one or more interactions with the one or more applications used by the device are categorized into one or more groups so that the record is provided to the one or more suppliers related to the one or more groups.

18. A method of classification a device user, the method comprising:
    detecting, by a classification application stored in a memory of a classification server and executable by a processor of the classification server, a first set of one or more interactions with one or more applications on a device, wherein the first set of one or more interactions are detected by the classification application through a network interface;
    identifying, by the classification application, a pattern of detecting one or more of the same interactions of the first set of one or more interactions with the one or more applications on the device;
    generating, by the classification application, a token based on the pattern of detecting the one or more of the same interactions; and
    attaching, by the classification application, the token to a record of a second set of one or more interactions with the one or more applications on the device.

19. The method of claim 18, further comprising attaching the record of the second set of one or more interactions with the attached token to a message and transmitting the message to a gateway.

20. The method of claim 19, further comprising masking the record of the second set of one or more interactions with the attached token before providing the record to a supplier.

* * * * *